United States Patent [19]

Hashimoto

[11] Patent Number: 4,618,672

[45] Date of Patent: Oct. 21, 1986

[54] BISAZO COMPOUNDS USEFUL AS CHARGE GENERATING PIGMENTS IN ELECTROPHOTOGRAPHY

[75] Inventor: Mitsuru Hashimoto, Numazu, Japan

[73] Assignee: Ricoh Company, Ltd., Tokyo, Japan

[21] Appl. No.: 256,162

[22] Filed: Apr. 21, 1981

[30] Foreign Application Priority Data

| Apr. 30, 1980 | [JP] | Japan | 55-56234 |
| Apr. 30, 1980 | [JP] | Japan | 55-56235 |
| Apr. 30, 1980 | [JP] | Japan | 55-56236 |
| Dec. 1, 1980 | [JP] | Japan | 55-169391 |
| Dec. 1, 1980 | [JP] | Japan | 55-169392 |
| Dec. 1, 1980 | [JP] | Japan | 55-169393 |
| Dec. 1, 1980 | [JP] | Japan | 55-169394 |

[51] Int. Cl.$^4$ ............... C09B 35/037; C09B 35/10; C09B 35/20; C09B 35/233
[52] U.S. Cl. ............... 534/658; 430/58; 430/72
[58] Field of Search ............... 260/177, 178, 174, 188, 260/184, 185; 534/658

[56] References Cited

FOREIGN PATENT DOCUMENTS 54-22834  6/1979  Japan ............... 260/174

Primary Examiner—Floyd D. Higel
Attorney, Agent, or Firm—Oblon, Fisher, Spivak, McClelland & Maier

[57] ABSTRACT

Bisazo compounds represented by the general formula

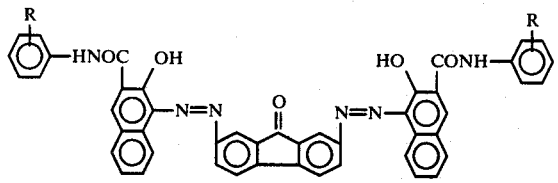

wherein R represents a halogen selected from the group consisting of fluorine, chlorine, bromine and iodine, and when R is fluorine, it is at the ortho, para or meta position in each phenylcarbamoyl group; when R is chlorine, it is at the ortho position; when R is bromine, it is positioned at the ortho or meta position; and when R is iodine, it is at the meta position, which bisazo compounds are particularly suitable for use in the charge generating layer of a layered electrophotographic photoconductor.

10 Claims, 11 Drawing Figures

/ ...

BISAZO COMPOUNDS USEFUL AS CHARGE GENERATING PIGMENTS IN ELECTROPHOTOGRAPHY

BACKGROUND OF THE INVENTION

The present invention relates to novel bisazo compounds represented by the general formula.

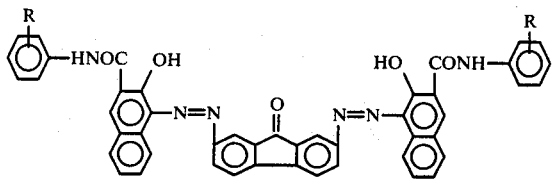

wherein R represents a halogen selected from the group consisting of fluorine, chlorine, bromine and iodine, and when R is fluorine, it is at the ortho, para or meta position in each phenylcarbamoyl group; when R is chlorine, it is at the ortho positions; when R is bromine, it is positioned at the ortho or meta positions; and when R is iodine, it is at the meta positions.

Conventionally, some of bisazo compounds have been found to be useful as charge generating pigments for use in a charge generating layer of a layered electrophotographic photoconductor. The layered electrophotographic photoconductor comprises an electrically conductive base, a charge generating layer formed on the electrically conductive base, and a charge transporting layer formed on the charge generating layer.

Generally, the charge generating layer is formed on the electrically conductive base by vacuum evaporation onto the electrically conductive base of a pigment capable of generating charge carriers upon impingement of light thereon, or by coating on the electrically conductive base a resinous liquid in which fine particles of such a pigment are dispersed. The charge transporting layer is usually made of a charge transporting material and a binder resin for holding the particles of the charge transporting material, and is capable of transporting charge carriers injected from the charge generating layer in the desired direction.

As bisazo pigments employed in a electrophotographic photoconductor of the above described type, bendizine-type bisazo compounds disclosed in U.S. Pat. No. 3,898,084 and U.S. Pat. No. 4,052,210, and fluorenone-type bisazo compounds disclosed in Japanese Laid-open patent application Ser. No. 54-22834 are known. Other bisazo pigments for use in an electrophotographic photoconductor are disclosed in U.S. Pat. No. 4,242,260.

However, the conventional layered electrophotographic organic photoconductors employing those bisazo compounds are low in photosensitivity in comparison with the conventional electrophotographic inorganic photoconductors employing selenium-arsenic alloys, for example, $As_2Se_3$ and therefore are not suitable for use in high speed copying.

SUMMARY OF THE INVENTION

It is therefore an object of the present invention to provide novel bisazo compounds suitable for use in the charge generating layer of a layered electrophotographic photoconductor, with the photosensitivity of the photoconductor increased significantly in comparison with the photosensitivity of the conventional electrophotographic photoconductors.

According to the present invention, the bisazo compounds represented by the following general formula are useful for the above-mentioned object:

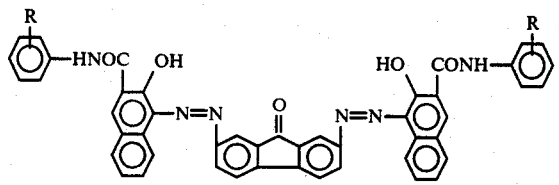

wherein R represents a halogen selected from the group consisting of fluorine, chlorine, bromine and iodine, and when R is fluorine, it is at the ortho, para or meta position in each phenylcarbamoyl group; when R is chlorine, it is at the ortho positions; when R is bromine, it is positioned at the ortho or meta positions; and when R is iodine, it is at the meta positions.

Those bisazo compounds are novel and conventionally have not been used in a layered electrophotographic photoconductor.

DETAILED DESCRIPTION OF THE PREFERRED EMBODIMENTS

Figure 1:
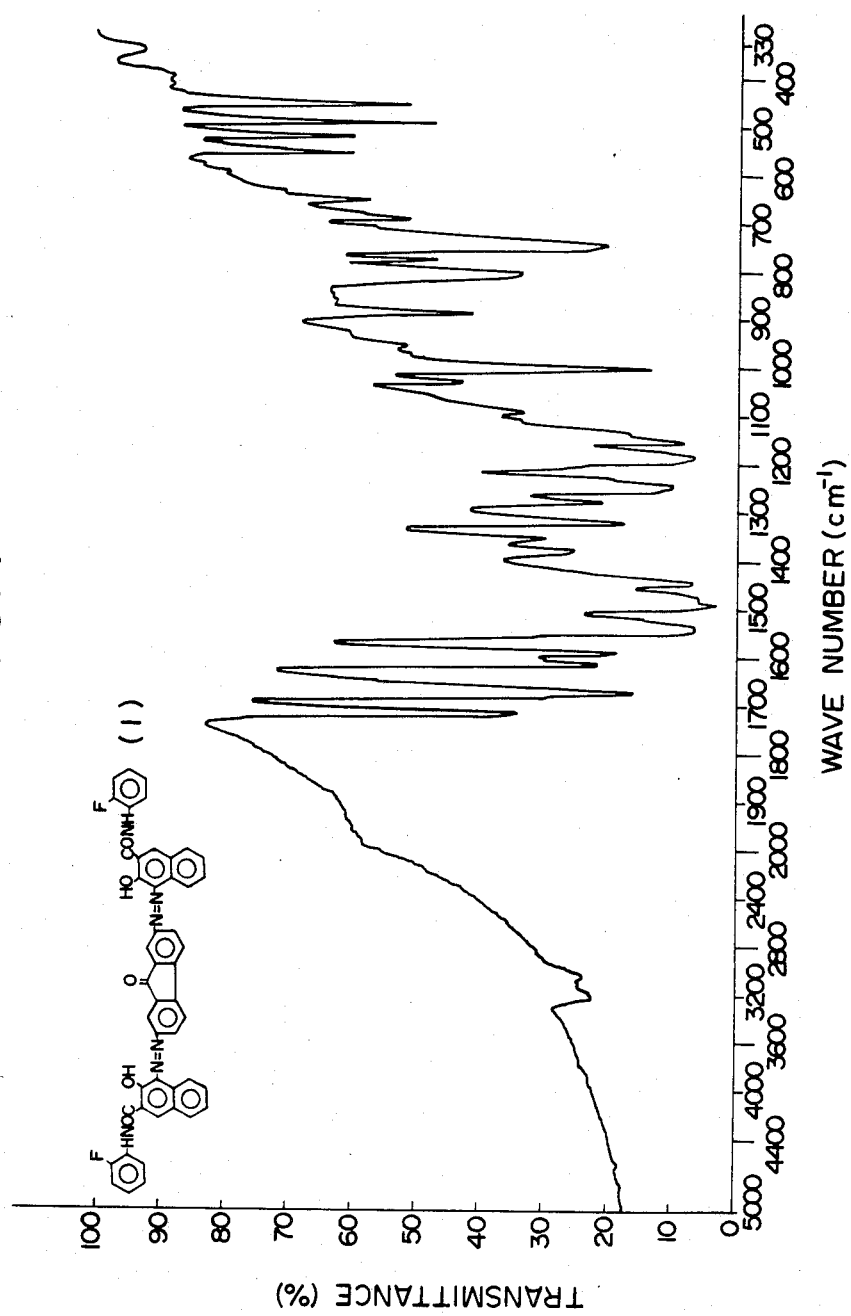
FIG. 1 through FIG. 7 are the infrared spectra of the novel bisazo compounds according to the present invention.

As mentioned previously, the novel bisazo compounds according to the present invention are represented by the general formula (I)

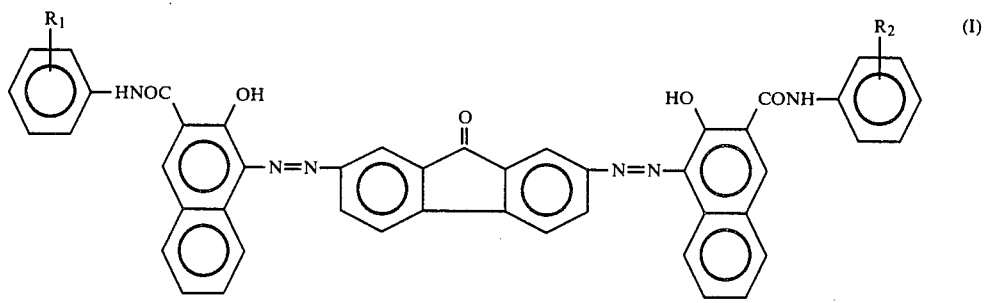
where $R_1$ and $R_2$ each represent a halogen atom selected from the group consisting of fluorine, chlorine, bromine and iodine.
More specifically, the examples of the novel bisazo compounds represented by the above general formula are as follows:

-continued

Compound No.

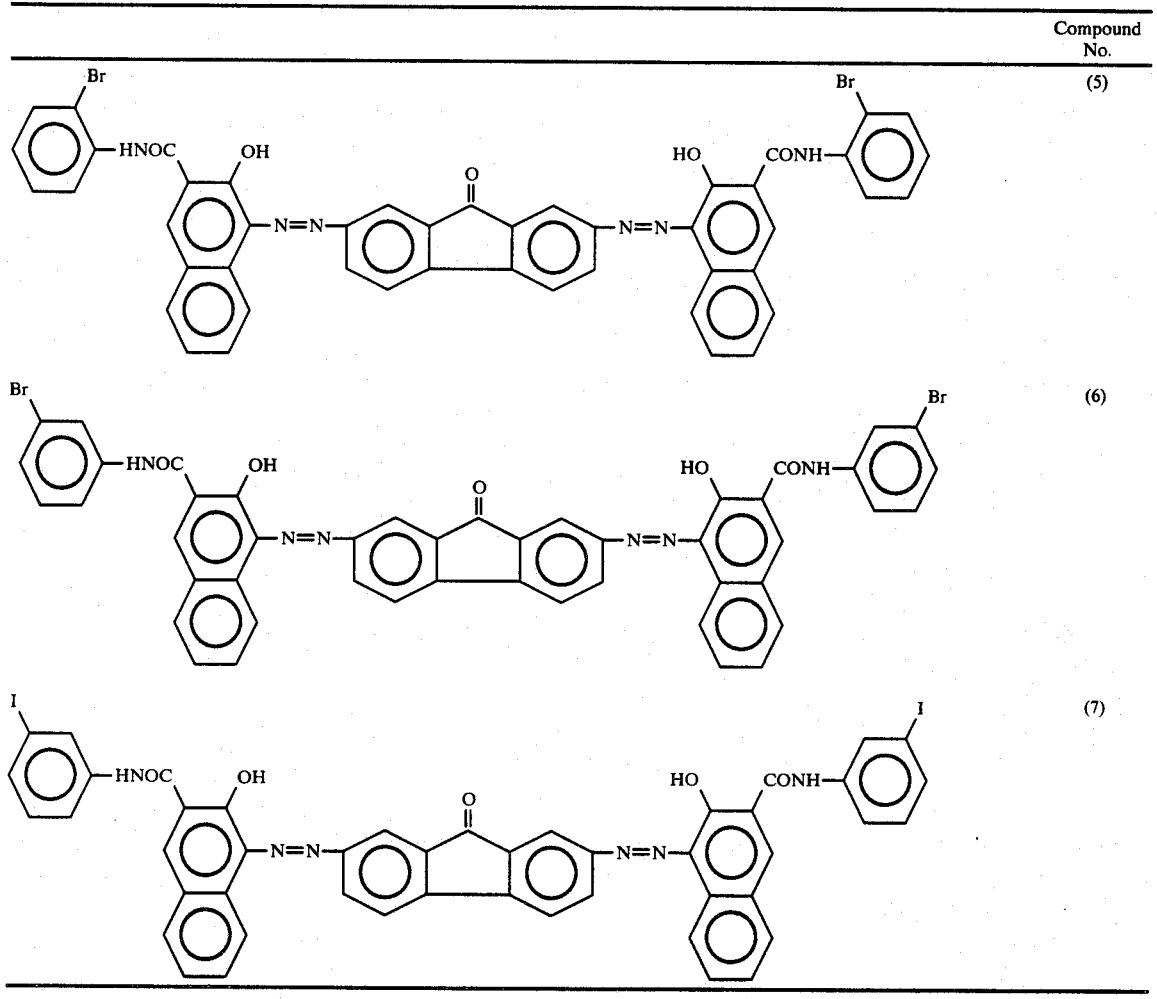

As can be seen from the above, $R_1$ and $R_2$ are limited to halogen atoms and their substitution positions are limited as described above with respect to each halogen atom.

More specifically, their most preferable substitution positions for attaining the object of the present invention are as follows:

When $R_1$ and $R_2$ are each fluorine, its substitution positions are the ortho, meta or para position in each phenylcarbamoyl group. When $R_1$ and $R_2$ are each chlorine, its substitution positions are the ortho position in each phenylcarbamoyl group. When $R_1$ and $R_2$ are each bromine, its substitution positions are the ortho or meta position in each phenylcarbamoyl group, while when $R_1$ and $R_2$ are each iodine, its substitution positions are limited to the metha position in each phenylcarbamoyl group.

As mentioned previously, those bisazo compounds are novel. Moreover, the substitution positions of those halogen atoms in the above-mentioned type bisazo compounds have not been investigated before from the view point of using those bisazo compounds in the charge generating layer of a layered electrophotographic photoconductor.

FIG. 1 through FIG. 7 are the infrared spectra of the above-mentioned respective bisazo compounds (1) through (7) according to the present invention. Those infrared spectra were obtained by use of KBr tablets.

The bisazo compounds according to the present invention are prepared as follows:

2,7-diamino-9-fluorenone represented by general formula (II)

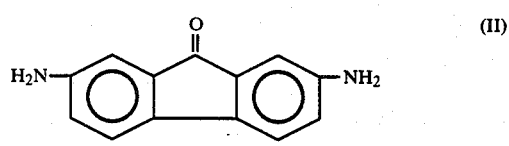

(II)

is subjected to diazotation to obtain a tetrazonium salt represented by general formula (III)

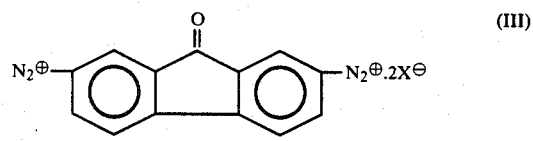

(III)

where X represents an anion functional group.

The thus obtained tetrazonium salt is then allowed to react with 2-hydroxy-3-phenylcarbamoyl naphthalene derivatives represented by general formula (IV)

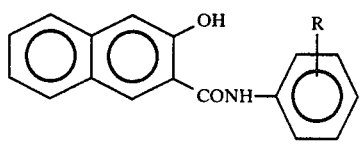

(IV)

where R represents a halogen selected from the group consisting of fluorine, chlorine, bromine and iodine, and when R is fluorine, it is at the ortho, para or meta position; when R is chlorine, it is at the ortho position; when R is bromine, it is positioned at the ortho or meta position; and when R is iodine, it is at the meta position.

Thus, the bisazo compounds according to the present invention can be prepared without any difficulty.

Diazotation of 2,7-diamino-9-fluorenone is conducted as follows:

2,7-diamino-9-fluorenone is added to a dilute inorganic acid, such as dilute hydrochloric acid or dilute sulfuric acid. To the mixture is added an aqueous solution of sodium nitrite, while maintaining the temperature of the mixture in the range of −10° C. to 10° C. The diazotation reaction terminates in 30 minutes to 3 hours. It is preferable that the diazonium compound of 2,7-diamino-9-fluorenone be separated in the form of the tetrazonium salt by adding, for example, fluoboric acid to the reaction mixture, to precipitate the tetrazonium salt. The tetrazonium salt is then separated from the solution by filtration. To the thus obtained tetrazonium salt is added one of the above-mentioned 2-hydroxy-3-phenylcarbamoyl naphthalene derivatives represented by the general formula (IV), so as to allow a coupling reaction. In practice, this coupling reaction is accomplished by dissolving both the tetrazonium salt and the coupling material in an organic solvent, such as N,N-dimethylformamide or dimethyl sulfoxide and then adding dropwise an alkaline aqueous solution, such as an aqueous solution of sodium acetate, while maintaining the reaction mixture at temperatures between approximately −10° C. to 40° C. The reaction terminates in 5 minutes to 3 hours.

When the thus prepared condensation product separates out from the reaction mixture, the product is filtered and is then purified by washing with water, an organic solvent or a mixture thereof, or by recrystallizing the product from an appropriate solvent.

Thus, the bisazo compound according to the present invention can be prepared with high purity.

The invention will now be described in more detail by reference to the following examples:

EXAMPLE 1

63.07 g of 2,7-diamino-9-fluorenone [Schmidt, Retzlaff Haid; Ann. 390 225 (1912)] was added to 1.2 l of a 6N hydrochloric acid. The mixture was stirred and cooled to 0° C. To the mixture, an aqueous solution of sodium nitrite consisting of 44.81 g of sodium nitrite and 180 ml of water was added dropwise over a period of about 1 hour. The rate of addition of the sodium nitrite solution was so regulated that the temperature remained at about 0° C. Thereafter, the reaction mixture was stirred for 30 minutes.

Unreacted materials were removed from the reaction mixture by filtration. To the filtrate was then added 400 ml of a 42 percent fluoboric acid. Yellowish-red crystals separated, which were collected on suction funnel and washed with cold water and dried, whereby 9-fluorenone-2,7-bisdiazonium bistetrafluoborate was obtained in the form of orange yellow crystals. The yield was 108.2 g (88.4%). The decomposition point of the thus obtained tetrazonium salt was about 155° C. The infrared spectra thereof was measured by use of a KBr tablet. The $\nu N_2^{\oplus}$ bond gave rise to infrared absorption at 2,300 cm$^{-1}$ and the $\nu CO$ bond gave rise to infrared absorption at 1,745 cm$^{-1}$. 2.04 g of the tetrazonium salt obtained and 2.81 g of a coupling component, 2-hydroxy-3-(2-fluorophenylcarbamoyl) naphthalene, were dissolved in 300 ml of N,N-dimethylformamide (DMF). To the solution, a sodium acetate aqueous solution consisting of 1.64 g of sodium acetate and 14 ml of water was added dropwise over a period of about 15 minutes, while the reaction mixture was kept at room temperature. After stopping the dropwise addition of the sodium acetate aqueous solution, the reaction mixture was stirred at room temperature for another 2 hours.

The crude crystals precipitated in the form of a cake were separated by filtration and were dispersed in 300 ml of DMF. That dispersion was stirred at 80° C. for 2 hours and then the crystals were collected by filtration. That purification procedure was repeated one more time. The thus purified crystals were washed with water and were then dried, whereby Disazo Compound No. 1 according to the present invention was obtained. The yield was 2.67 g (67.3%). The color of the crystals was dark purple and the decomposition point thereof was above 300° C.

The elemental analysis of the product indicated as follows:

|     | Found | Calculated |
| --- | --- | --- |
| % C | 70.92 | 71.03 |
| % H | 3.80 | 3.55 |
| % N | 10.31 | 10.58 |

The infrared spectra of Disazo Compound No. 1 was measured by use of a KBr tablet. The $\nu CO$ bond of the fluorenone group gave rise to infrared absorption at 1,720 cm$^{-1}$ and the $\nu CO$ bond of the secondary amide gave rise to infrared absorption at 1,675 cm$^{-1}$ as shown in FIG. 1.

EXAMPLE 2

Figure 2:
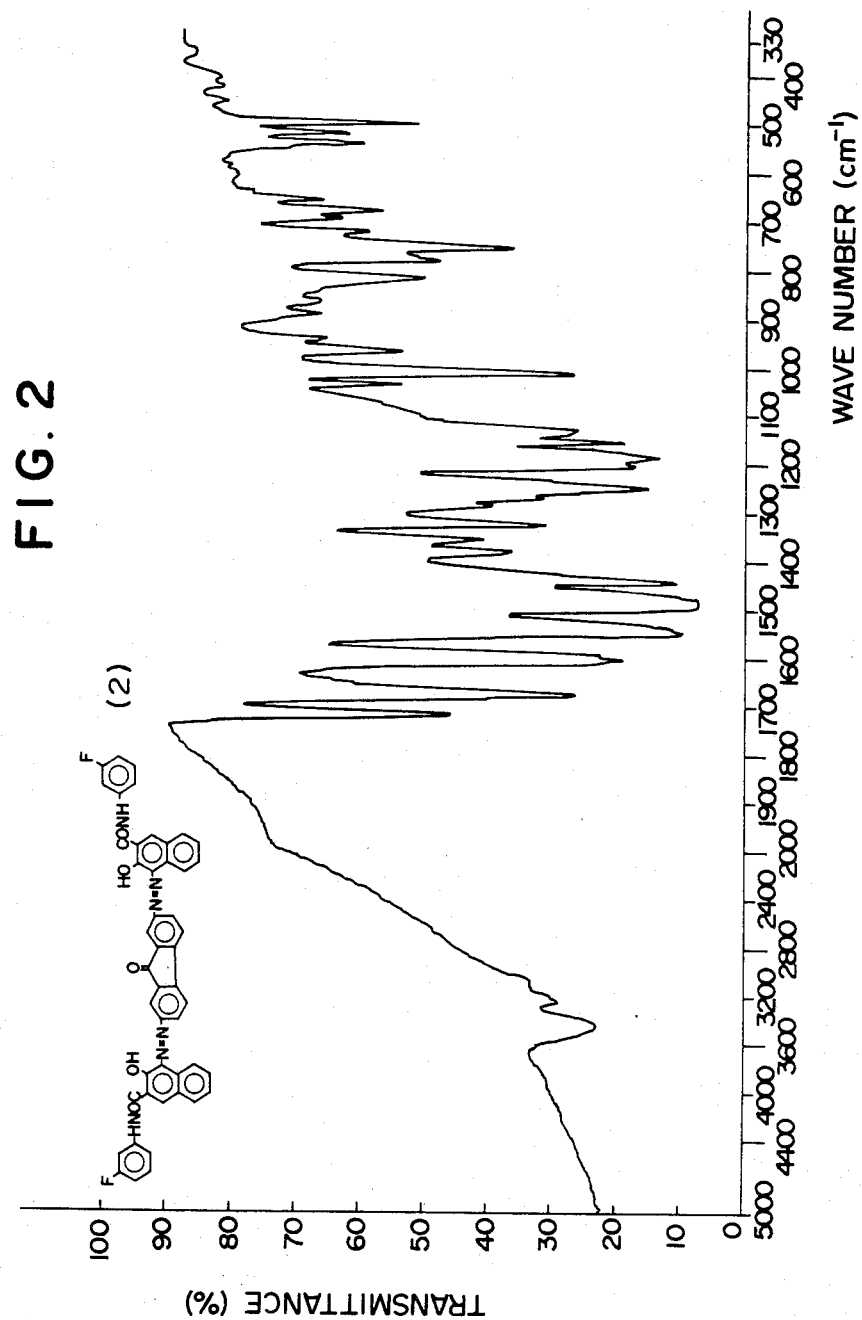

In Example 1, 2-hydroxy-3-(2-fluorophenylcarbamoyl) naphthalene was replaced by 2.81 g of 2-hydroxy-3-(3-fluorophenylcarbamoyl) naphthalene, so that Bisazo Compound No. 2 was prepared. Table 1 shows the yield, appearance, decomposition point and infrared absorptions of Bisazo Compound No. 2 and the results of elemental analysis of the same. The infrared spectra of Bisazo Compound No. 2 is shown in FIG. 2.

EXAMPLE 3

Figure 3:
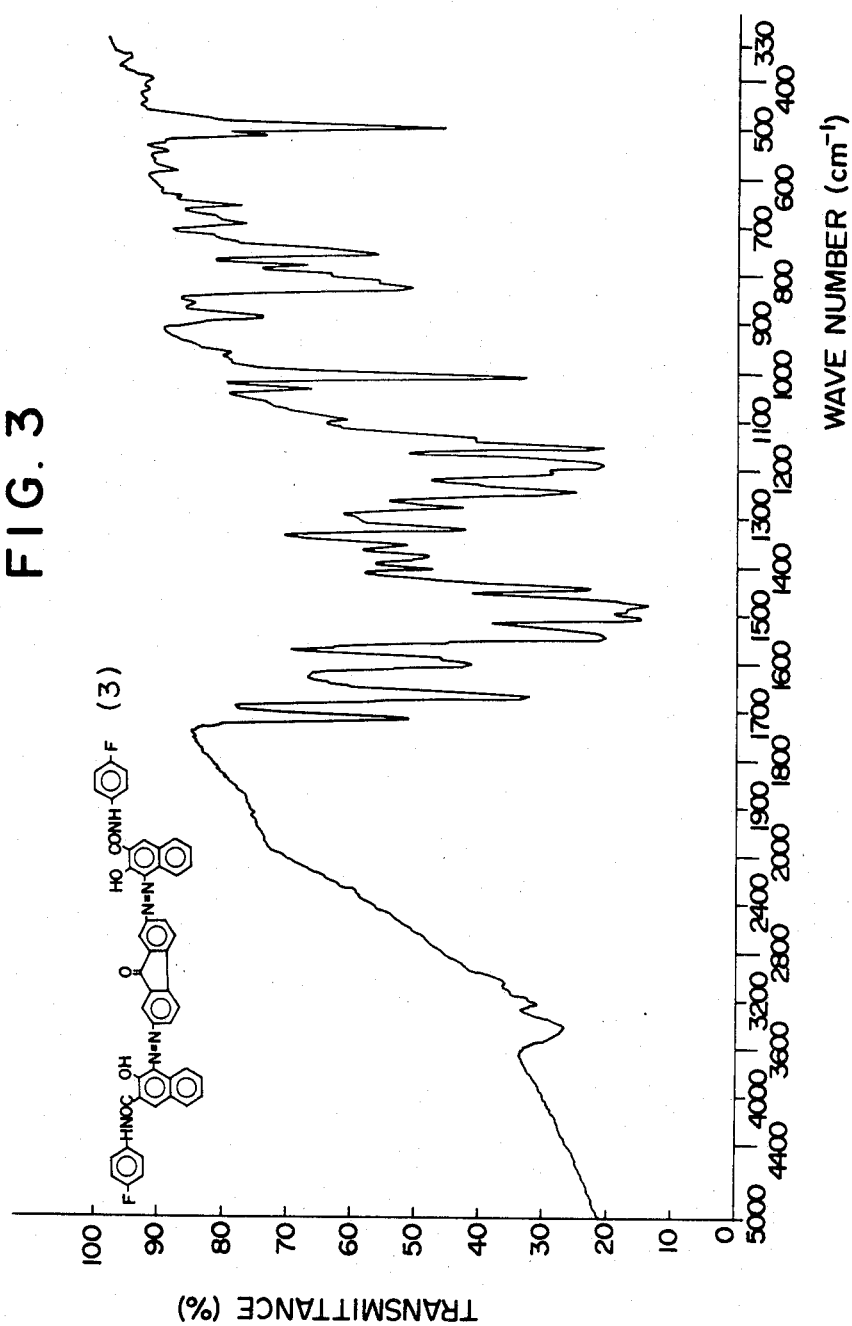

In Example 1, 2-hydroxy-3-(2-fluorophenylcarbamoyl) naphthalene was replaced by 2.81 g of 2-hydroxy-3-(4-fluorophenylcarbamoyl) naphthalene, so that Bisazo Compound No. 3 was prepared. Table 1 shows the yield, appearance, decomposition point, and infrared absorptions of Bisazo Compound No. 3 and the results of elemental analysis of the same. The infrared spectra of Bisazo Compound No. 3 is shown in FIG. 3.

EXAMPLE 4

Figure 4:
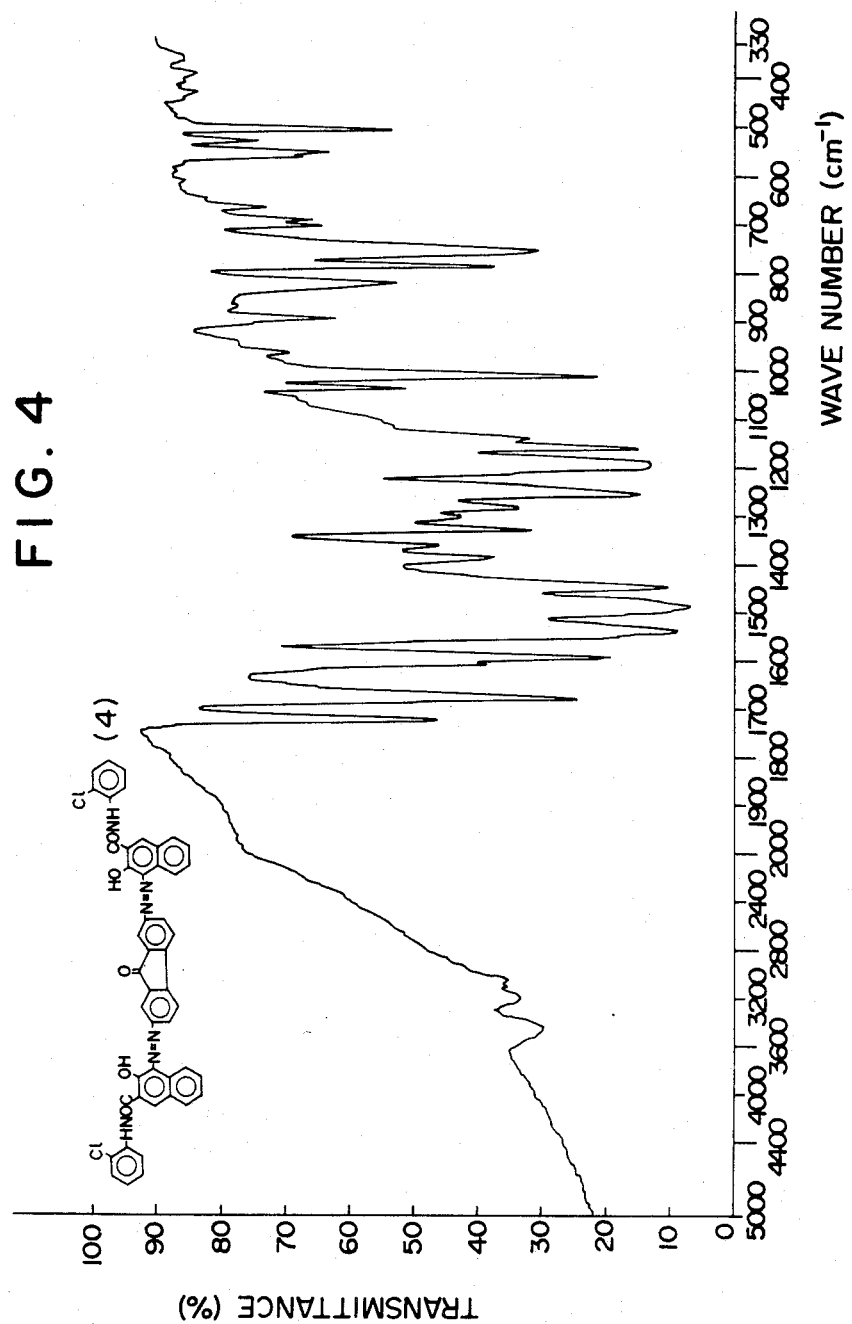

In Example 1, 2-hydroxy-3-(2-fluorophenylcarbamoyl) naphthalene was replaced by 2.98 g of 2-hydroxy-3-(2-chlorophenylcarbamoyl) naphthalene, so that Bisazo Compound No. 4 was prepared. Table 1 shows the yield, appearance, decomposition point and infrared absorptions of Bisazo Compound No. 4 and the results of elemental analysis of the same. The infrared spectra of Bisazo Compound No. 4 is shown in FIG. 4.

EXAMPLE 5

Figure 5:
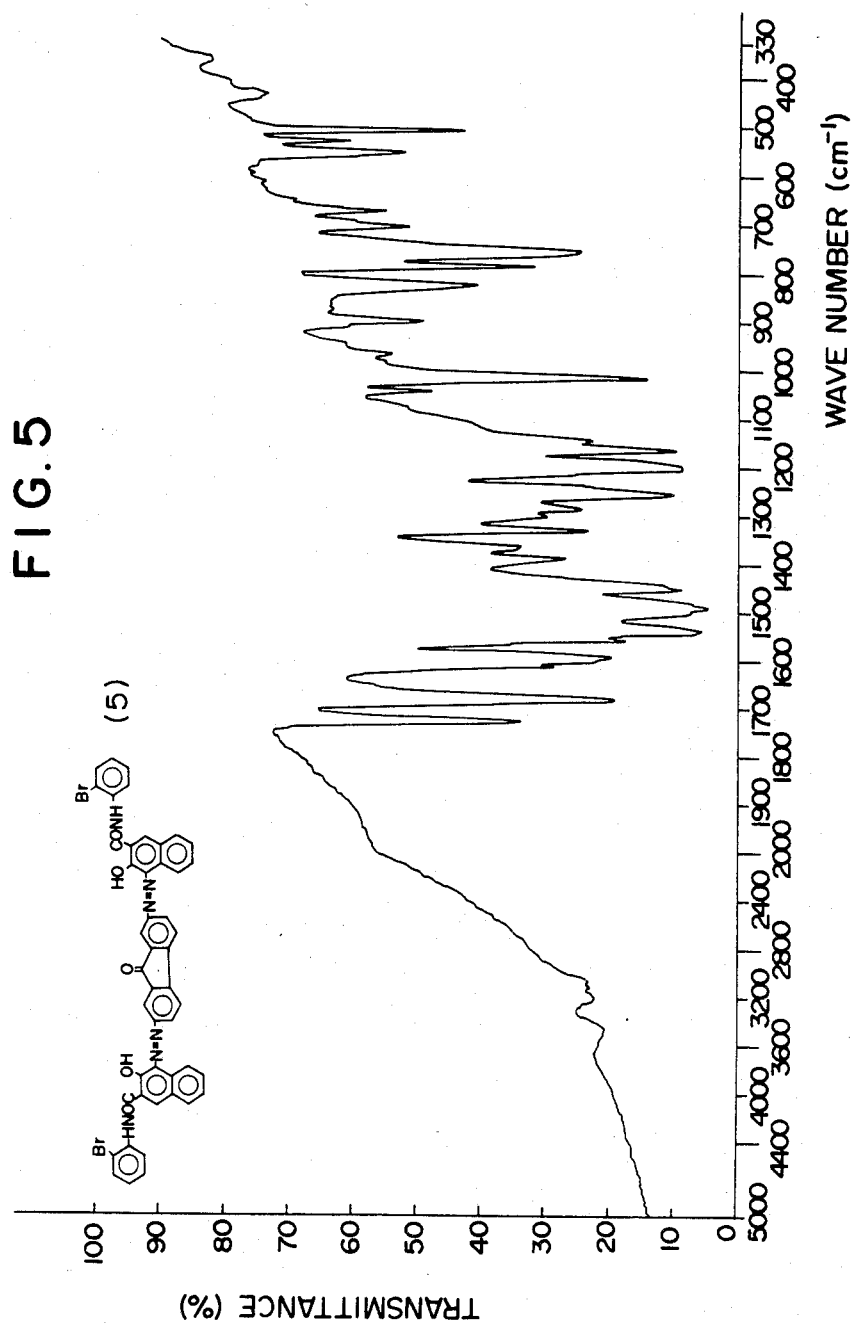

In Example 1, 2-hydroxy-3-(2-fluorophenylcarbamoyl) naphthalene was replaced by 3.42 g of 2-hydroxy-3-(2-bromophenylcarbamoyl) naphthalene, so that Bisazo Compound No. 5 was prepared. Table 1 shows the yield, appearance, decomposition point and infrared absorptions of Bisazo Compound No. 5 and the results of elemental analysis of the same. The infrared spectra of Bisazo Compound No. 5 is shown in FIG. 5.

EXAMPLE 6

Figure 6:
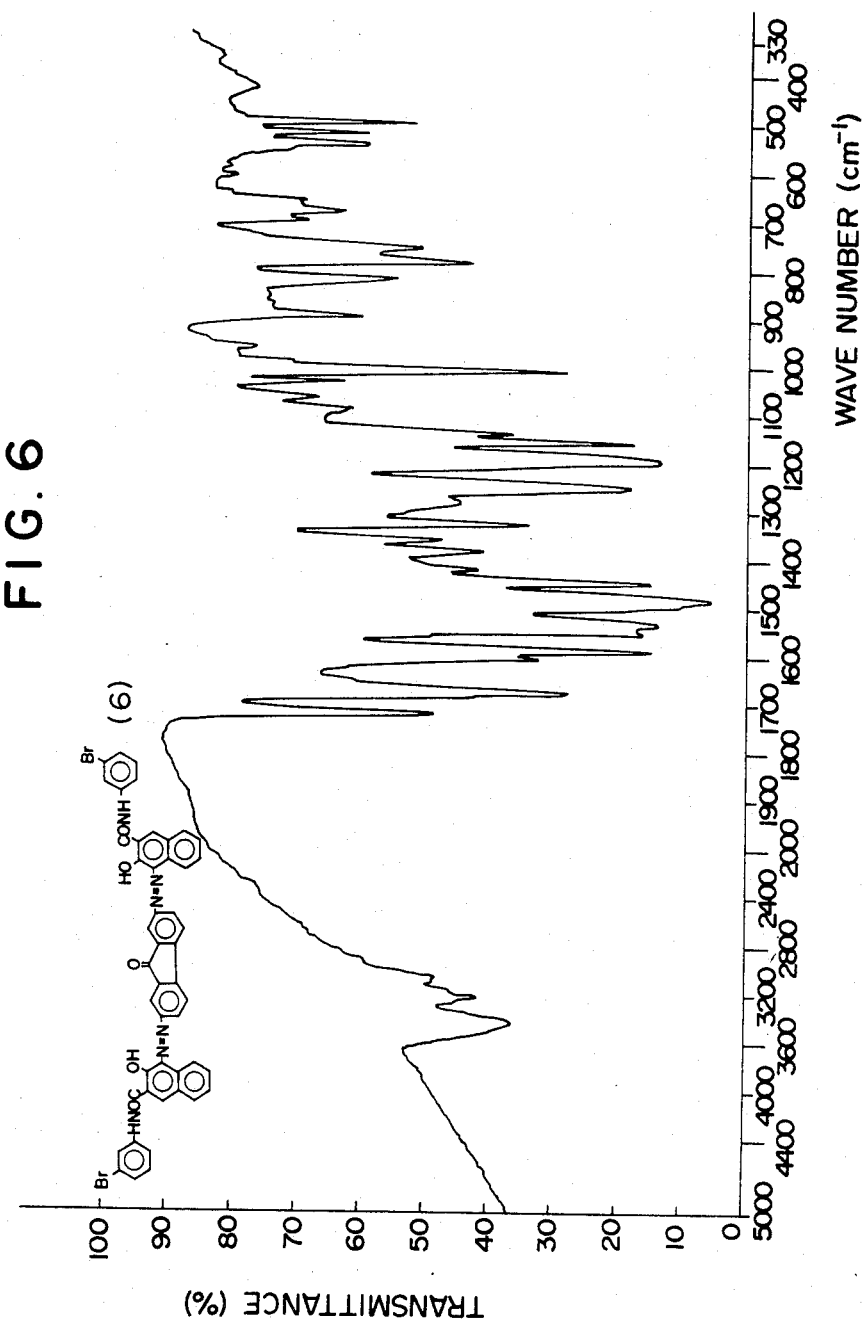

In Example 1, 2-hydroxy-3-(2-fluorophenylcarbamoyl) naphthalene was replaced by 3.42 g of 2-hydroxy-3-(3-bromophenylcarbamoyl) naphthalane, so that Bisazo Compound No. 6 was prepared. Table 1 shows the yield, appearance, decomposition point and infrared absorptions of Bisazo Compound No. 6 and the results of elemental analysis of the same. The infrared spectra of Bisazo Compound No. 6 is shown in FIG. 6.

EXAMPLE 7

Figure 7:
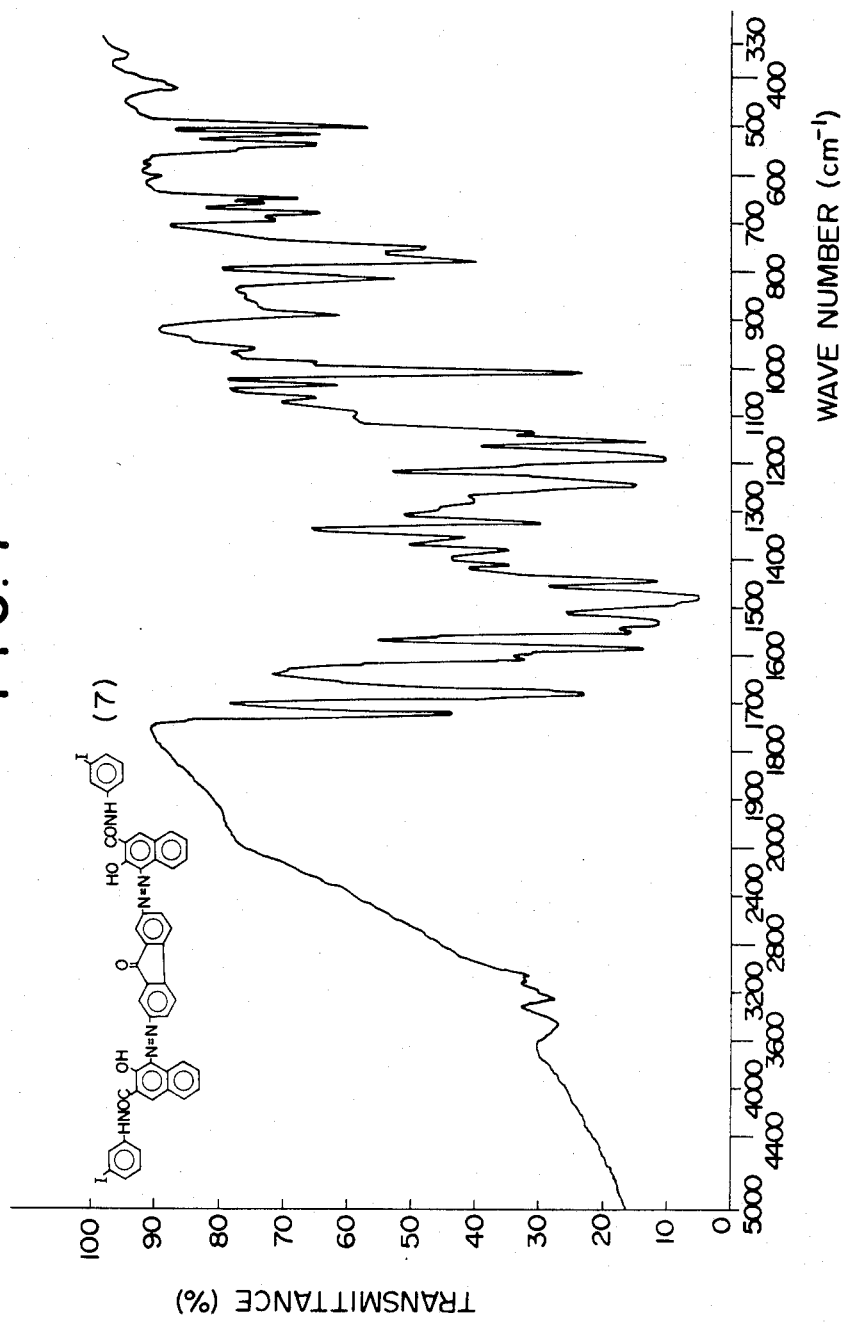

In Example 1, 2-hydroxy-3-(2-fluorophenylcarbamoyl) naphthalene was replaced by 3.89 g of 2-hydroxy-3-(3-iodophenylcarbamoyl) naphthalene, so that Bisazo Compound No. 7 was prepared. Table 1 shows the yield, appearance, decomposition point and infrared absorptions of Bisazo Compound No. 7 and the results of elemental analysis of the same. The infrared spectra of Bisazo Compound No. 7 is shown in FIG. 7.

TABLE 1

| Compound No. | Coupler | Yield | Appearance | Decomposition Point | Elemental Analysis | | Infrared Spectrum (KBr disc) | |
|---|---|---|---|---|---|---|---|---|
| | | | | | | Found | Calculated | | |
| 2 | HO, CONH—(2-F phenyl) 2.81 g | 63.2% | Dark Purple | >300° C. | % C<br>% H<br>% N | 70.81<br>3.30<br>10.38 | 71.03<br>3.55<br>10.58 | $V_{co}$ (Fluorenone)<br>$V_{co}$ (Secondary Amide) | 1,720 cm$^{-1}$<br>1,680 cm$^{-1}$ |
| 3 | HO, CONH—(3-F phenyl) 2.81 g | 44.8% | Dark Purple | >300° C. | % C<br>% H<br>% N | 70.80<br>3.43<br>10.28 | 71.03<br>3.55<br>10.58 | $V_{co}$ (Fluorenone)<br>$V_{co}$ (Secondary Amide) | 1,720 cm$^{-1}$<br>1,675 cm$^{-1}$ |
| 4 | HO, CONH—(2-Cl phenyl) 2.98 g | 78.7% | Dark Purple | >300° C. | % C<br>% H<br>% N | 68.07<br>3.28<br>10.09 | 68.20<br>3.41<br>10.16 | $V_{co}$ (Fluorenone)<br>$V_{co}$ (Secondary Amide) | 1,725 cm$^{-1}$<br>1,675 cm$^{-1}$ |
| 5 | HO, CONH—(2-Br phenyl) 3.42 g | 83.7% | Dark Purple | >300° C. | % C<br>% H<br>% N | 61.35<br>2.93<br>8.99 | 61.59<br>3.08<br>9.17 | $V_{co}$ (Fluorenone)<br>$V_{co}$ (Secondary Amide) | 1,725 cm$^{-1}$<br>1,680 cm$^{-1}$ |

TABLE 1-continued

| Compound No. | Coupler | Yield | Appearance | Decomposition Point | Elemental Analysis % Found | Elemental Analysis % Calculated | Infrared Spectrum (KBr disc) | |
|---|---|---|---|---|---|---|---|---|
| 6 | HO—CONH—⟨Br⟩ 3.42 g | 74.3% | Dark Purple | >300° C. | % C 61.38<br>% H 3.01<br>% N 9.10 | 61.59<br>3.08<br>9.17 | $V_{co}$ (Fluorenone)<br>$V_{co}$ (Secondary Amide) | 1,725 cm$^{-1}$<br>1,680 cm$^{-1}$ |
| 7 | HO—CONH—⟨I⟩ 3.89 g | 61.4% | Dark Purple | >300° C. | % C 55.79<br>% H 2.80<br>% N 8.28 | 55.86<br>2.79<br>8.32 | $V_{co}$ (Fluorenone)<br>$V_{co}$ (Secondary Amide) | 1,725 cm$^{-1}$<br>1,680 cm$^{-1}$ |

As mentioned previously, the inventor of the present invention has discovered that the novel bisazo compounds according to the present invention are extremely useful as charge carrier generating pigments for use in the charge generating layer of a layered electrophotographic photoconductor.

Figure 8:
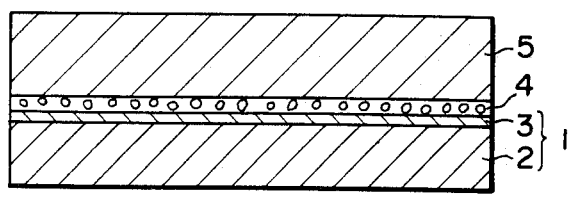
FIG. 8 is a schematic sectional view of a layered electrophotographic photoconductor in which a bisazo compound according to the present invention is employed, enlarged in the direction of the thickness of the photoconductor.

By use of Bisazo Compounds No. 1 to No. 7 according to the present invention, Electrophotographic Photoconductors P1 to P7 were respectively prepared, which Electrophotographic Photoconductors P1 to P7 are of the type shown in FIG. 8. In the figure, reference numeral 1 represents an electrically conductive base consisting of a polyester base 2 and an aluminum film layer 3 which is evaporated on the electrically conductive base 1. Reference numeral 4 represents a charge generating layer, and reference numeral 5, a charge transporting layer which is formed on the charge generating layer 4.

Preparation of Electrophotographic Photoconductors P1 to P7

The preparation of the Electrophotographic Photoconductors P1 to P7 will now be explained. All of those photoconductors can be prepared in the same manner as follows:

A mixture of 76 parts by weight of one of the bisazo compounds No. 1 to No. 7 according to the present invention, 1260 parts by weight of a polyester resin tetrahydrofuran solution containing a polyester resin (Vylon 200 made by Toyobo Company, Ltd.), in which the content of the solid component is 2 weight percent; and 3700 parts by weight of tetrahydrofuran was ground in a ball mill. The thus prepared dispersion was coated on the aluminum surface side of an aluminum-evaporated polyester film by a doctor blade and was then dried at room temperature, so that a charge carrier generating layer about 1 μm thick was formed on the aluminum-evaporated polyester film.

Furthermore, two parts by weight of 9-ethylcarbazole-3-aldehyde 1-methyl-1-phenylhydrazone, two parts by weight of a polycarbonate resin (Trade Name: Panlite K 1300 made by Teijin Limited) and 16 parts by weight of tetrahydrofuran were mixed to form a solution. This solution was coated on the charge carrier producing layer by a doctor blade and was then dried at 80° C. for 2 minutes and then at 100° C. for 5 minutes, so that a charge transporting layer about 20 μm thick was formed on the charge carrier producing layer, whereby layered type photoconductors P1 to P7 as shown in FIG. 8 were prepared.

Preparation of Comparative Electrophotographic Photoconductor

For comparison, Comparative Electrophotographic Photoconductors C1 to C6 were prepared by the same procedure as mentioned above by use of Comparative Pigments (1) to (6), instead of the bisazo compounds according to the present invention.

Comparative Pigment (1) is 4,4'-bis(2-hydroxy-3-penylcarbamoyl-1-naphthylazo)-3,3'-dichlorophenyl (Chlorodiane Blue) which is a benzidine-type bisazo pigment disclosed in U.S. Pat. No. 3,898,084.

Comparative Pigment (2) is 2,7-bis[2-hydroxy-3-(4-chlorophenylcarbamoyl)-1-naphthylazo]-9-fluorenone, which is a fluorenone-type bisazo pigment disclosed in Japanese Laid-open patent application Ser. No. 54-22834.

Comparative Pigment (3) is 2,7-bis[2-hydroxy-3-(2-methyl-5-chlorophenylcarbamoyl)-1-naphthylazo]-9-fluorenone, which is another fluorenone-type bisazo pigment disclosed in Japanese Laid-open patent application Ser. No. 54-22832.

Comparative Pigment (4) is 2,7-bis[2-hydroxy-3-(4-bromophenylcarbamoyl)-1-naphthylazo]-9-fluorenone.

Comparative Pigment (5) is 2,7-bis[2-hydroxy-3-(2-iodophenylcarbamoyl)-1-naphthylazo]-9-fluorenone.

Comparative Pigment (6) is, 2,7-bis[2-hydroxy-3-(4-iodophenylcarbamoyl)-1-naphthylazo]-9-fluorenone.

In addition, Comparative Electrophotographic Photoconductor C7 which is an As$_2$Se$_3$ photoconductor was prepared.

Specifically, the As$_2$Se$_3$ photoconductor was prepared as follows:

In a vacuum chamber with a vacuum of 10$^{-6}$ Torr, an aluminum plate substrate was placed over a selenium-arsenic (40 wt. %) alloy in an evaporation source. The temperature of the aluminum substrate was maintained at 200° C., while the selenium-arsenic alloy in the evaporation source was heated to 410° C. to 415° C. Evaporation of the selenium-arsenic alloy was permitted to continue until a layer of selenium-arsenic alloy with a thickness of approximately 60 μm was formed on the aluminum substrate, whereby Comparative Electrophotographic Photoconductor C7 was prepared.

Each of the thus prepared electrophotographic photoconductors P1 to P7 and C1 to C6 was charged negatively in the dark under application of −6kV of corona charge for 20 seconds by a commercially available electrostatic copying sheet testing apparatus (Paper Analyzer Model SP-428 made by Kawaguchi Electro Works) and the surface potential $V_{do}$ volts) thereof was measured. Each photoconductor was then allowed to stand in the dark for 20 seconds without applying any charge thereto, and the surface potential $V_{po}$ (V) of the photoconductor at that moment was measured. The photoconductor was then illuminated by a tungsten lamp in such a manner that the illuminance on the illuminated surface of the photoconductor was 20 lux, and the exposure $E_{\frac{1}{2}}$ (lux. seconds) required to reduce the initial surface potential $V_{po}$ (V) to ½ the initial surface potential $V_{po}$ (V) was measured. Likewise, the exposure $E_{1/5}$ (lux.seconds) required to reduce the initial surface potential $V_{po}$ (V) to 1/5 the initial surface potential $V_{po}$ (V) and the Exposure $E_{1/10}$ required to reduce the initial surface potential $V_{po}$ (V) to 1/10 the initial surface potential $V_{po}$ (V) were measured.

As to Comparative Electrophotographic Photoconductor C7, it was charged positively in the dark under application of +6kV, and $E_{\frac{1}{2}}$, $E_{1/5}$ and $E_{1/10}$ thereof were measured in exactly the same manner as mentioned above.

The results are shown in Table 2.

As mentioned previously, the Electrophotographic Photoconductors P1 to P7 according to the present invention and the Comparative Electrophotographic Photoconductors C2 to C6 each comprise (1) an electrically conductive base consisting of a polyester base and an aluminum film layer formed on the polyester base, (2) a charge generating layer containing one of the bisazo compounds represented by the general formula

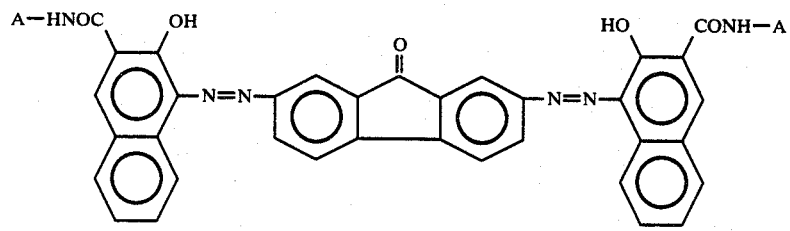

wherein A for each photoconductor is shown in Table 2, which charge generating layer is formed on the electrically conductive base, and (3) a charge transporting layer containing 9-ethylcarbazole-3-aldehyde 1-methyl-1-phenylhydrazone.

Comparative Photoconductor C1 has the same structure as mentioned above. However, its charge generating layer contains Chlorodiane Blue as mentioned previously.

Comparative Photoconductor C7 comprises an aluminum base and a selenium-arsenic alloy film deposited on the aluminum base by vacuum evaporation as mentioned previously.

TABLE 2

| Photoconductor | CGL | $V_{do}$ (Volt) | $V_{po}$ (Volt) | $V_{po}/V_{do}$ | $E_{\frac{1}{2}}$ (lux · sec.) | $E_{1/5}$ (lux · sec.) | $E_{1/10}$ (lux · sec.) |
|---|---|---|---|---|---|---|---|
| P1 | A = –⟨phenyl⟩–F | −1069 | −829 | 0.775 | 1.9 | 3.0 | 3.7 |
| P2 | A = –⟨phenyl-F (meta)⟩ | 990 | −539 | 0.544 | 1.3 | 2.0 | 2.7 |
| P3 | A = –⟨phenyl⟩–F | −1126 | −727 | 0.646 | 1.5 | 2.4 | 3.1 |
| P4 | A = –⟨phenyl-Cl⟩ | −1131 | −774 | 0.684 | 1.1 | 1.7 | 2.2 |

TABLE 2-continued

| Photoconductor | CGL | $V_{do}$ (Volt) | $V_{po}$ (Volt) | $V_{po}/V_{do}$ | $E_{1/2}$ (lux · sec.) | $E_{1/5}$ (lux · sec.) | $E_{1/10}$ (lux · sec.) |
|---|---|---|---|---|---|---|---|
| P5 | A = -C₆H₄-Br (ortho-Br) 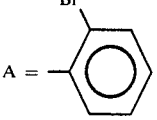 | −781 | −466 | 0.597 | 1.0 | 1.5 | 2.1 |
| P6 | A = -C₆H₄-Br (meta-Br) 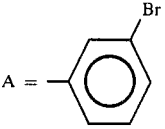 | −1057 | −603 | 0.570 | 1.1 | 1.8 | 2.5 |
| P7 | A = -C₆H₄-I 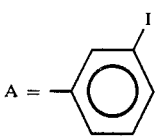 | −1019 | −495 | 0.486 | 1.0 | 1.7 | 2.5 |
| C1 | Chlorodiane Blue | −940 | −693 | 0.737 | 5.9 | 12.3 | 16.7 |
| C2 | A = -C₆H₄-Cl 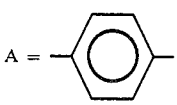 | −189 | −23 | 0.124 | 6.2 | 13.7 | 16.3 |
| C3 | A = CH₃-C₆H₃-Cl 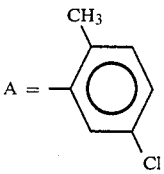 | −92 | 0 | — | — | — | — |
| C4 | A = -C₆H₄-Br 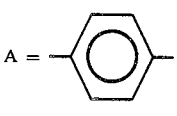 | −1466 | −1221 | 0.833 | 8.5 | 16.6 | 21.0 |
| C5 | A = -C₆H₄-I 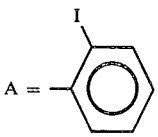 | −1106 | −941 | 0.851 | 3.8 | 8.2 | 11.0 |
| C6 | A = -C₆H₄-I 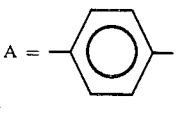 | −1372 | −1163 | 0.848 | 3.8 | 7.4 | 9.4 |
| C7 | $As_2Se_3$ | +1613 | +1198 | 0.743 | 1.3 | 1.9 | 2.3 |

CGL: Charge Generating Layer

As can be seen from the results summarized in Table 2, the photosensitivities of Electrophotographic Photoconductors P1 to P7 are extremely high in comparison with the photosensitivities of Comparative Electrophotographic Photoconductors C1 to C6. Furthermore, the photosensitivities of Electrophotographic Photoconductors P1 to P7 are substantially equal to the photosensitivities of Comparative Electrophotographic Photoconductor C7, which is an inorganic selenium-arsenic photoconductor. It is significant that the photosensitivities of the Electrophotographic Photoconductors P1 to P7 are exceedingly higher than the photosensitivities of conventional organic electrophotographic photoconductors.

For more specific comparison of the photoconductors according to the present invention with Comparative Photoconductor C7 in terms of photosensitivity, the spectral sensitivities of Photoconductors P4, P5 and P6 and the spectral sensitivity of Comparative Photoconductor C7 were measured and compared with each other.

Measurement of the spectral sensitivity of each photoconductor was conducted as follows:

Each of Photoconductors P4, P5 and P6 was negatively charged in the dark under application of negative charges by corona charging until the surface potential of the photoconductor increased to more than −800 volts.

Each of the photoconductors was then allowed to stand in the dark without applying any charges thereto until the surface potential thereof decreased to −800 volts. At that moment, monochromatic light of 1 μW/cm² was projected upon the photoconductor by use of a monochrometer and the time in seconds required to reduce the surface potential from −800 volts to −400 volts and the quantity of exposure light (μW sec/cm²) were measured, whereby the light decay rate (volt·cm²·μW⁻¹·sec⁻¹) of each photoconductor was calculated. In this calculation, the decrease in the surface potential during exposure was corrected from the dark decay curve of each photoconductor, taking into consideration the continued dark decay of the surface potential in the unexposed area of the photoconductor during the exposure time obtained above. In other words, the difference in surface potential between the exposed area and the unexposed area of each photoconductor is not exactly 400 volts, but slightly less than that, since the dark decay continues in the unexposed area of the photoconductor during the above-mentioned exposure process using monochromatic light.

Comparative Photoconductor C7 was positively charged in the dark until the surface potential thereof increased to more than +800 volts and the light decay rate thereof was obtained in the same manner as mentioned above. As a matter of course, the above-mentioned correction was done with respect to the decrease in surface potential of Comparative Photoconductor C7 during the exposure process.

Figure 9:
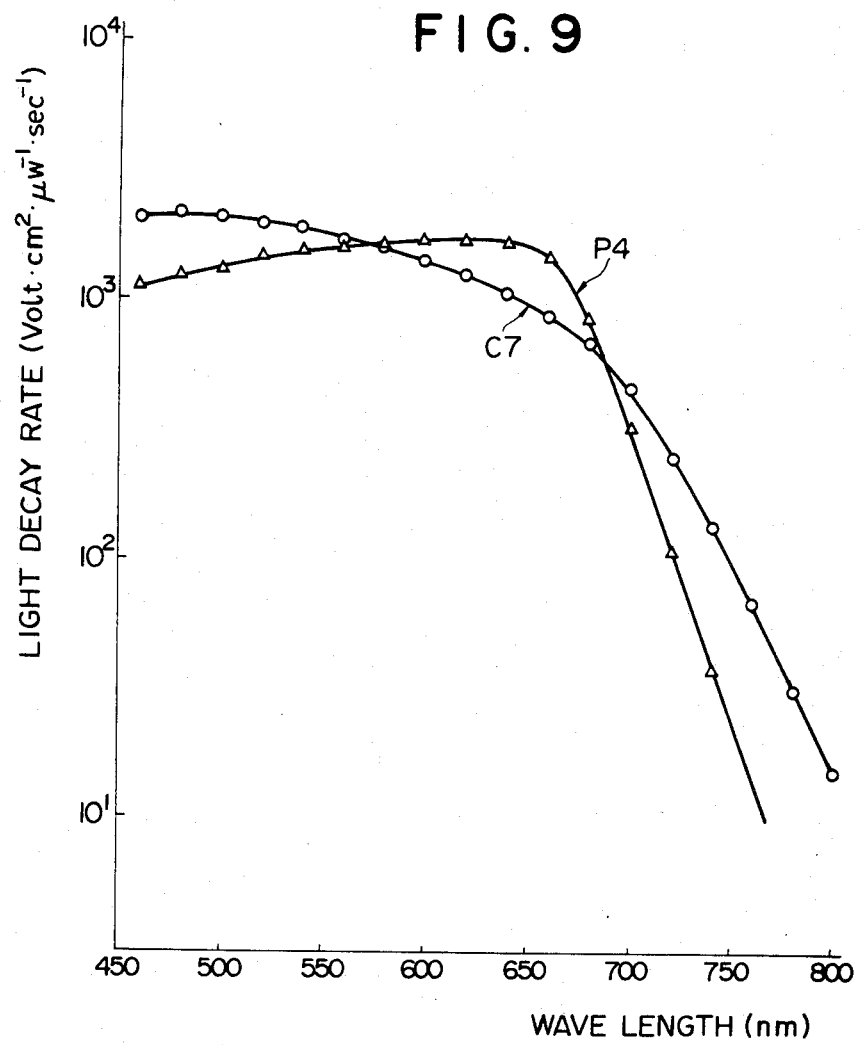
FIG. 9 through FIG. 11 are the spectral sensitivity curves of the electrophotographic photoconductors employing the bisazo compounds according to the present invention and the spectral sensitivity of a conventional inorganic photoconductor for comparison.
Figure 10:
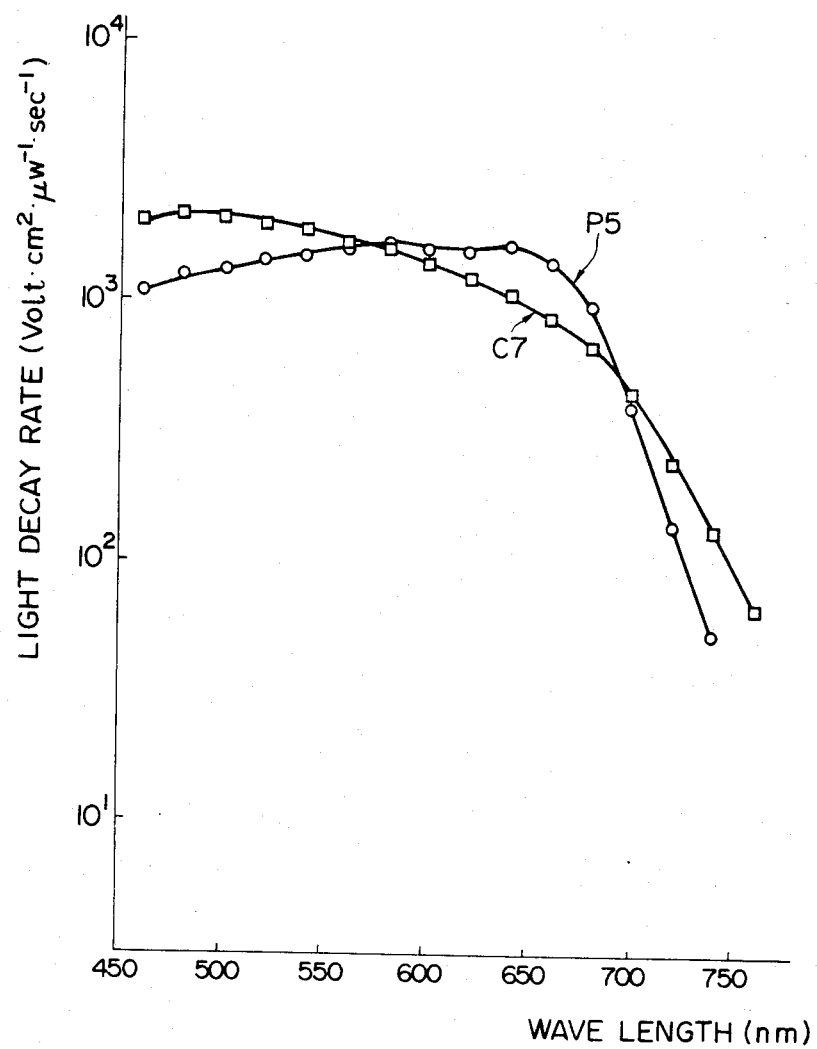
Figure 11:
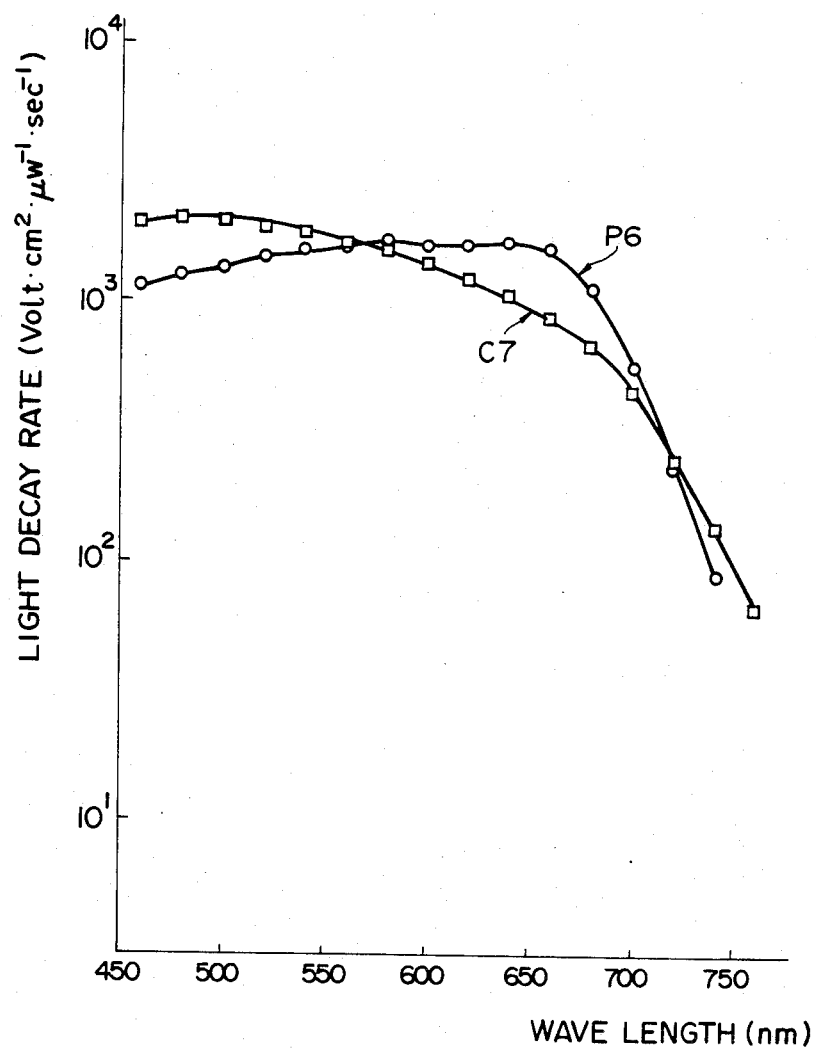

The results are shown in FIG. 9 to FIG. 11.

From the results shown in FIG. 9 to FIG. 11, the maximum spectral sensitivities of Photoconductors P4, P5 and P6 are each at about 640 nm. With respect to a helium-neon laser (6328 Å), the photosensitivities of Photoconductors P4, P5 and P6 are 1.6 times the photosensitivity of Comparative Photoconductor C7.

This indicates that the photoconductors according to the present invention are extremely useful when they are employed in a copying machine utilizing helium-neon laser light for exposure.

The embodiments of the hydrazone compounds according to the present invention are intended to be merely exemplary and those skilled in the art will be able to make variations and modifications in them without departing from the spirit and scope of the invention.

For instance, the halogen atoms present in the phenylcarbamoyl groups of the bisazo compounds are not limited so as to be symmetrical in terms of their substitution positions and kinds of halogen atoms. All such modifications and variations are contemplated as falling within the scope of the claims.

What is claimed is:

1. A bisazo compund of the formula

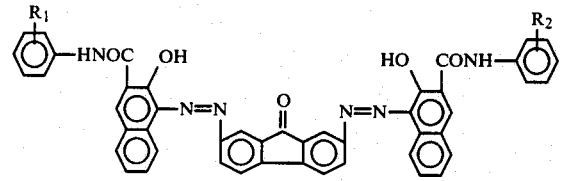

wherein $R_1$ and $R_2$ each represent a halogen selected from the group consisting of fluorine, chlorine, bromine and iodine, and when $R_1$ or $R_2$ is fluorine, it is present at the ortho, para or meta position in each phenylcarbamoyl group;

when $R_1$ or $R_2$ is chlorine, it is at the ortho position in each phenylcarbamoyl group;

when $R_1$ or $R_2$ is bromine, it is at the ortho or meta position in each phenylcarbamoyl group; and when $R_1$ or $R_2$ is iodine, it is at the meta position in each phenylcarbamoyl group.

2. The compound according to claim 1, wherein $R_1$ and $R_2$ in said formula each represent a fluorine atom which is present at the ortho, para or meta position in each phenylcarbamoyl group.

3. The compound according to claim 1, wherein $R_1$ and $R_2$ in said formula each represent a chlorine atom which is present at the ortho position of each phenylcarbamoyl group.

4. The compound according to claim 1, wherein $R_1$ and $R_2$ in said formula each represent a bromine atom which is present at the ortho or meta position of each phenylcarbamoyl group.

5. The compound according to claim 1, wherein $R_1$ and $R_2$ in said formula each represent an iodine atom which is present at the meta position of each phenylcarbamoyl group.

6. A bisazo compound represented by the formula

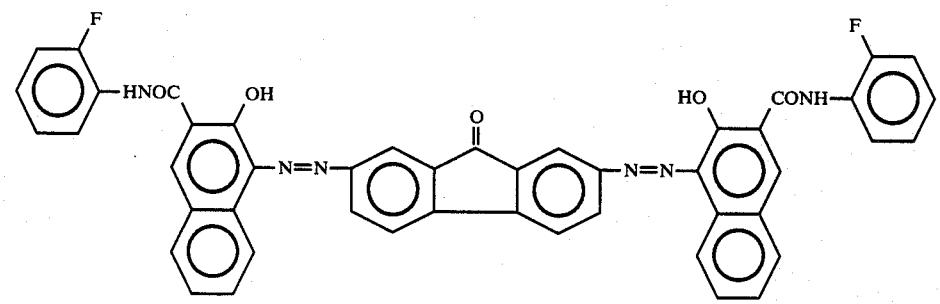

7. A bisazo compound represented by the formula

8. A bisazo compound represented by the formula
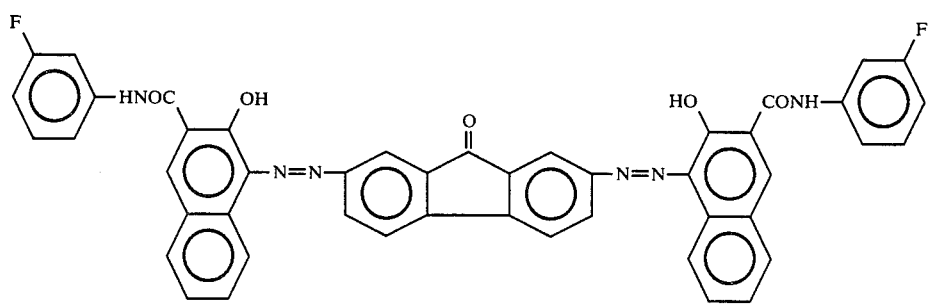
9. A bisazo compound represented by the formula
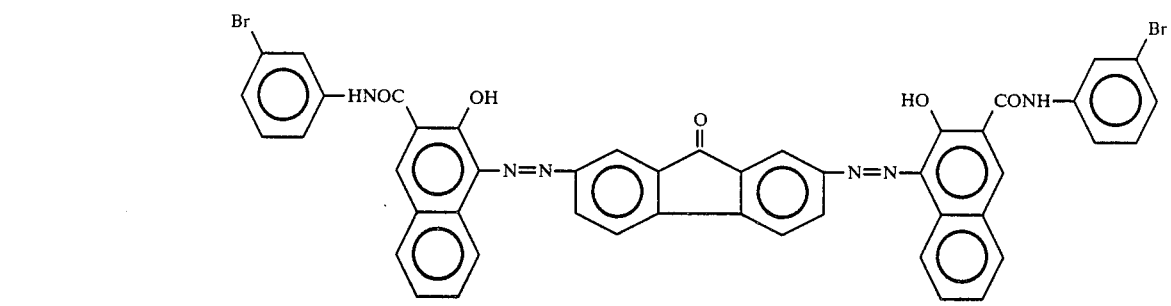
10. A bisazo compund represented by the formula
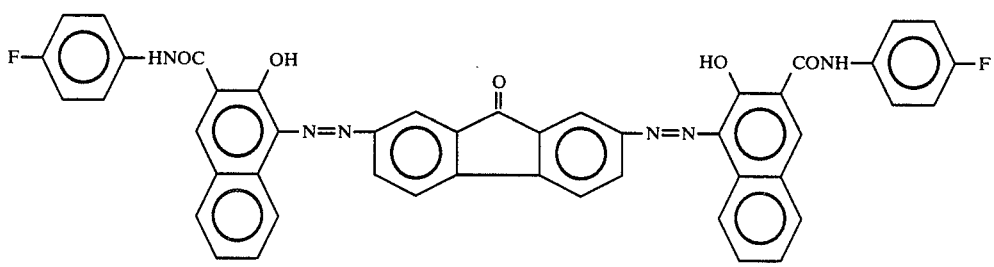
* * * * *